(12) United States Patent
Muroya et al.

(10) Patent No.: US 11,342,639 B2
(45) Date of Patent: May 24, 2022

(54) SECONDARY BATTERY AND BATTERY PACK INCLUDING THE SAME

(71) Applicants: SANYO Electric Co., Ltd., Daito (JP); Panasonic Corporation, Kadoma (JP)

(72) Inventors: Yohei Muroya, Hyogo (JP); Ryoichi Wakimoto, Hyogo (JP); Hiroyuki Inoue, Hyogo (JP); Keisuke Shimizu, Osaka (JP)

(73) Assignees: SANYO Electric Co., Ltd., Osaka (JP); Panasonic Holdings Corporation, Osaka (JP)

( * ) Notice: Subject to any disclaimer, the term of this patent is extended or adjusted under 35 U.S.C. 154(b) by 633 days.

(21) Appl. No.: 16/217,774

(22) Filed: Dec. 12, 2018

(65) Prior Publication Data

US 2019/0189998 A1 Jun. 20, 2019

(30) Foreign Application Priority Data

Dec. 19, 2017 (JP) .............................. JP2017-242269

(51) Int. Cl.
*H01M 50/572* (2021.01)
*H01M 50/578* (2021.01)
(Continued)

(52) U.S. Cl.
CPC ....... *H01M 50/578* (2021.01); *H01M 50/155* (2021.01); *H01M 50/543* (2021.01); *H01M 50/572* (2021.01); H01M 10/0525 (2013.01); H01M 50/15 (2021.01); H01M 50/528 (2021.01); H01M 2200/103 (2013.01)

(58) Field of Classification Search
CPC ....... H01M 2200/103; H01M 10/0525; H01M 50/15; H01M 50/528; H01M 50/155; H01M 50/572; H01M 50/543; H01M 50/578
See application file for complete search history.

(56) References Cited

U.S. PATENT DOCUMENTS

| 10,952,893 B2 * | 3/2021 | Inoue ..................... B32B 27/36 |
| 2010/0227217 A1 * | 9/2010 | Fujikawa ............ H01M 50/171 429/185 |

(Continued)

FOREIGN PATENT DOCUMENTS

| JP | 2009-295554 A | 12/2009 |
| JP | 2013-89592 A | 5/2013 |

(Continued)

*Primary Examiner* — Alexander Usyatinsky
(74) *Attorney, Agent, or Firm* — WHDA, LLP

(57) ABSTRACT

A secondary battery includes an electrode body that includes a positive electrode plate and a negative electrode plate; an outer body that houses the electrode body; a sealing plate that is made of metal and seals an opening of the outer body; and a positive electrode terminal that is electrically connected to the positive electrode plate. At least part of the positive electrode terminal is disposed on the battery outer side with respect to the sealing plate. An external insulating member made of resin is disposed between the sealing plate and the positive electrode terminal. The conduction path between the positive electrode plate and the positive electrode terminal is provided with a current interrupting mechanism. An electrically insulating, heat-resistant layer is disposed between the positive electrode terminal and the sealing plate.

15 Claims, 9 Drawing Sheets

(51) Int. Cl.
*H01M 50/155* (2021.01)
*H01M 50/543* (2021.01)
*H01M 10/0525* (2010.01)
*H01M 50/15* (2021.01)
*H01M 50/528* (2021.01)

(56) References Cited

U.S. PATENT DOCUMENTS

| | | | |
|---|---|---|---|
| 2013/0095372 A1* | 4/2013 | Kim | H01M 50/538 |
| | | | 429/178 |
| 2016/0181589 A1* | 6/2016 | Yokoyama | H01M 50/538 |
| | | | 429/61 |

FOREIGN PATENT DOCUMENTS

| | | | |
|---|---|---|---|
| JP | 2015-072880 A | | 4/2015 |
| JP | 2015-097174 A | | 5/2015 |
| JP | 2015097174 | * | 5/2015 |
| JP | 2015-230795 A | | 12/2015 |
| JP | 2016-119210 A | | 6/2016 |
| JP | 2017-139200 A | | 8/2017 |
| WO | WO2014119095 | * | 7/2014 |
| WO | 2014/119095 A1 | | 8/2014 |
| WO | WO 2016017733 | * | 2/2016 |

* cited by examiner

SECONDARY BATTERY AND BATTERY PACK INCLUDING THE SAME

CROSS REFERENCE TO RELATED APPLICATIONS

The present invention application claims priority to Japanese Patent Application No. 2017-242269 filed in the Japan Patent Office on Dec. 19, 2017, the entire contents of which are incorporated herein by reference.

BACKGROUND OF THE INVENTION

Field of the Invention

The present invention relates to a secondary battery and a battery pack including the same.

Description of Related Art

Non-aqueous electrolyte secondary batteries are used as driving power sources for electric vehicles (EVs) and hybrid electric vehicles (HEVs, PHEVs), and as stationary storage battery systems, for example, for use in reducing the output fluctuations of solar power, wind power, and other resources, and for use in peak shift of grid-connected power to store power at night and use it for daytime. In these applications, secondary batteries connected in parallel are used.

For these secondary batteries, Japanese Published Unexamined Patent Application Nos. 2016-119210 and 2013-089592 (Patent Documents 1 and 2) disclose techniques for disposing a current interrupting mechanism or a fuse part in the conduction path between an electrode body and a terminal to improve reliability. The current interrupting mechanism operates in response to an increase in the internal pressure of the battery case.

The fuse part melts and breaks upon the flow of a large current.

BRIEF SUMMARY OF THE INVENTION

A secondary battery and a battery pack including the same need to ensure high reliability in case of a short circuit that may occur inside the secondary battery.

An object of the present invention is to provide a secondary battery having high reliability and a battery pack including the same.

A secondary battery according to an aspect of the present invention includes:
an electrode body that includes a positive electrode plate and a negative electrode plate;
an outer body that has an opening and houses the electrode body;
a sealing plate that is made of metal and seals the opening; and
a terminal that is electrically connected to the positive electrode plate or the negative electrode plate,
wherein
a conduction path between the positive electrode plate or the negative electrode plate and the terminal is provided with a current interrupting mechanism or a fuse part,
the terminal is attached to the sealing plate via an insulating member made of resin,
at least part of the terminal is disposed on the battery outer side with respect to the sealing plate, and
an electrically insulating, intermediate heat-resistant layer or an electrically insulating, intermediate heat-resistant member is disposed between the terminal and the sealing plate.

The inventors of the present invention have found that there is the following issue in a battery pack including secondary batteries that are connected in parallel and each have a current interrupting mechanism or a fuse part in a conduction path between the electrode body and the terminal.

In the case where secondary batteries are connected in parallel and a short circuit occurs between positive and negative electrodes in one secondary battery, a current flows into the secondary battery in which the short circuit has occurred from other secondary batteries connected in parallel. Thus, the secondary battery in which the short circuit has occurred in the case where secondary batteries are connected in parallel tends to reach a higher-temperature state than that in the case where secondary batteries are not connected in parallel. When the secondary battery reaches a high-temperature state, the electrolyte decomposes to increase the pressure of gas in the battery case, and the current interrupting mechanism operates. Since the operation of the current interrupting mechanism causes disconnection of the conduction path between the electrode body and the terminal, the current flow from other secondary batteries into the secondary battery in which the short circuit has occurred is terminated.

In the case where secondary batteries have a fuse part and a short circuit occurs between positive and negative electrodes in one secondary battery, the fuse part melts and breaks due to a short-circuit current to disconnect the conduction path between the electrode body and the terminal. Thus, the current flow from other secondary batteries into the secondary battery in which the short circuit has occurred is terminated.

However, even when the current flow from other secondary batteries into the secondary battery in which the short circuit has occurred is terminated, the chemical reaction inside the battery or the like may maintain the high-temperature state of the secondary battery in which the short circuit has occurred or may increase the temperature of the secondary battery in which the short circuit has occurred. In the case where the secondary battery reaches a high-temperature state, there is a possibility that an insulating member made of resin that insulates between the terminal and the sealing plate may melt. If an insulating member made of resin between a positive electrode terminal and the sealing plate and an insulating member made of resin between a negative electrode terminal and the sealing plate both melt, the positive electrode terminal and the negative electrode terminal are each electrically connected to the sealing plate. This forms a conduction path of positive electrode terminal-sealing plate-negative electrode terminal and thus forms a closed circuit with the secondary batteries connected in parallel. Then, a current flows in the secondary batteries connected in parallel, and a large current flows in the secondary batteries connected in parallel to the secondary battery in which the short circuit has occurred. As a result, an abnormal event may occur in the secondary batteries connected in parallel to the secondary battery in which the short circuit has occurred.

The secondary battery according to the aspect has a structure in which electrical connection between the terminal and the sealing plate is unlikely to occur even if the insulating member between the terminal and the sealing plate melts. Even if a short circuit occurs inside one of the secondary batteries connected in parallel, an abnormal event is unlikely to occur in secondary batteries different from the secondary battery in which the short circuit has occurred.

The electrically insulating, intermediate heat-resistant layer preferably has a resistivity of $1.0\times10^4$ Ω·cm or higher at 25° C. The electrically insulating, intermediate heat-resistant layer preferably has a resistivity of $1.0\times10^4$ Ω·cm or higher at 400° C. The electrically insulating, intermediate heat-resistant layer preferably has a higher melting point than the insulating member made of resin disposed between the terminal and the sealing plate. The electrically insulating, intermediate heat-resistant layer preferably has a melting point of 400° C. or higher. In the case where the electrically insulating, intermediate heat-resistant layer is made of two or more materials, at least one of the materials of the electrically insulating, intermediate heat-resistant layer preferably has a melting point of 400° C. or higher.

The electrically insulating, intermediate heat-resistant member preferably has a resistivity of $1.0\times10^4$ Ω·cm or higher at 25° C. The electrically insulating, intermediate heat-resistant member preferably has a resistivity of $1.0\times10^4$ Ω·cm or higher at 400° C. The electrically insulating, intermediate heat-resistant member preferably has a higher melting point than the insulating member made of resin disposed between the terminal and the sealing plate. The electrically insulating, intermediate heat-resistant member preferably has a melting point of 400° C. or higher. In the case where the electrically insulating, intermediate heat-resistant member is made of two or more materials, at least one of the materials of the electrically insulating, intermediate heat-resistant member preferably has a melting point of 400° C. or higher.

The present invention can provide a secondary battery with high reliability and a battery pack including the same.

DETAILED DESCRIPTION OF THE INVENTION

Figure 1A:
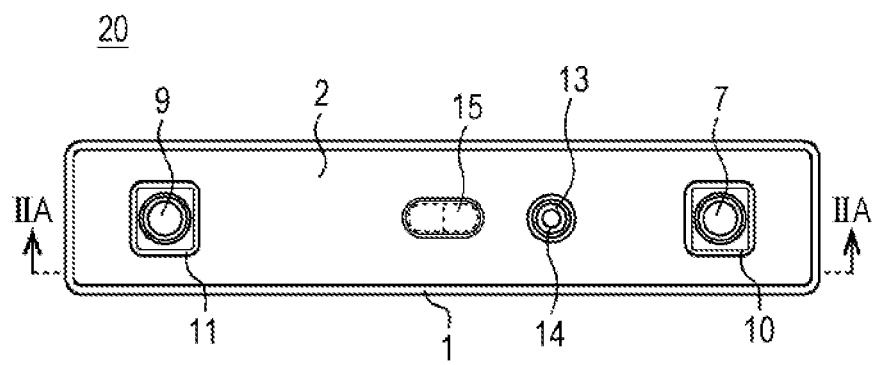
FIG. 1A is a top view of a prismatic secondary battery according to an embodiment.
Figure 1B:
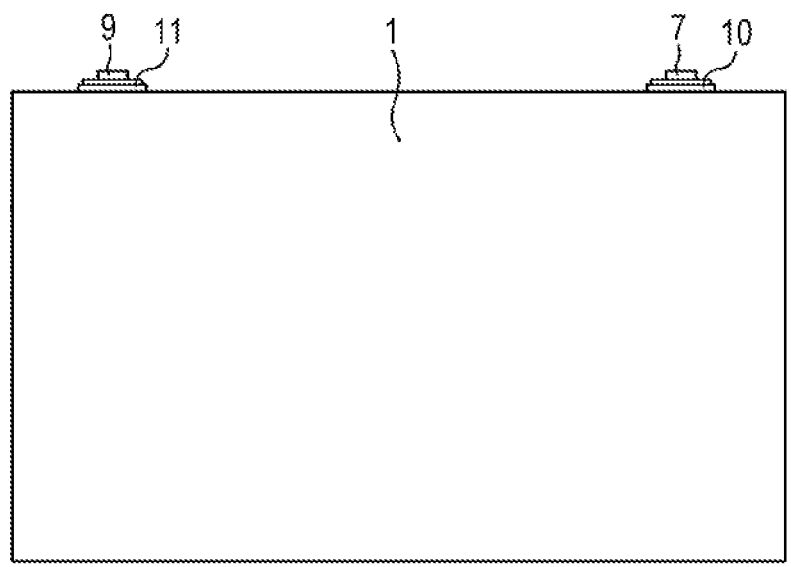
FIG. 1B is a side view of the prismatic secondary battery according to the embodiment.
Figure 2A:
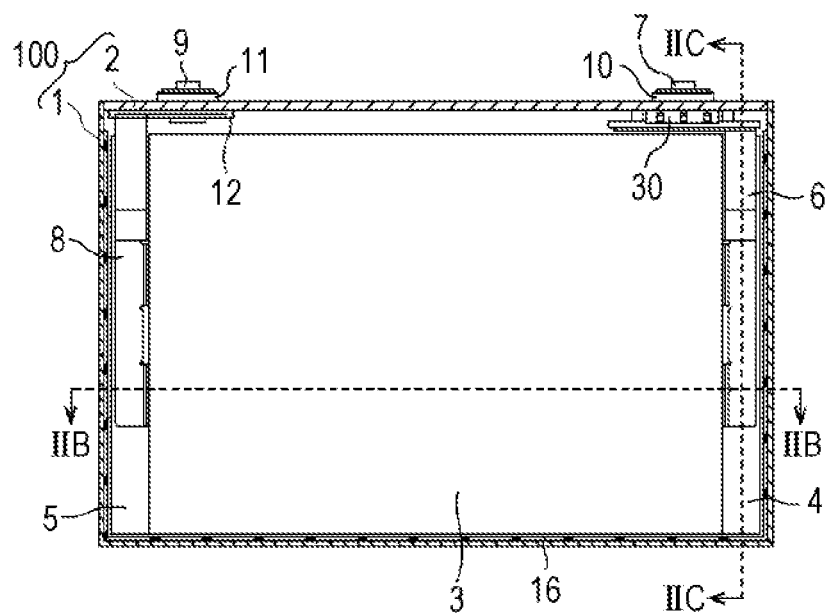
FIG. 2A is a cross-sectional view taken along line IIA-IIA in FIG. 1.
Figure 2C:
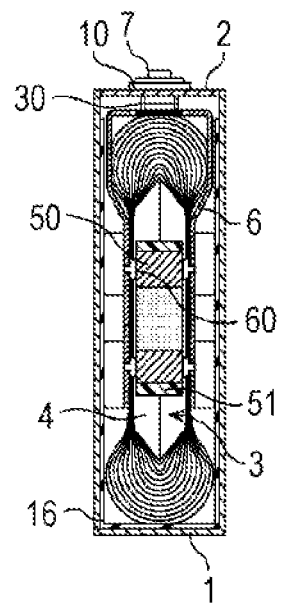
FIG. 2C is a cross-sectional view taken along line IIC-IIC in FIG. 2A.
Figure 2B:
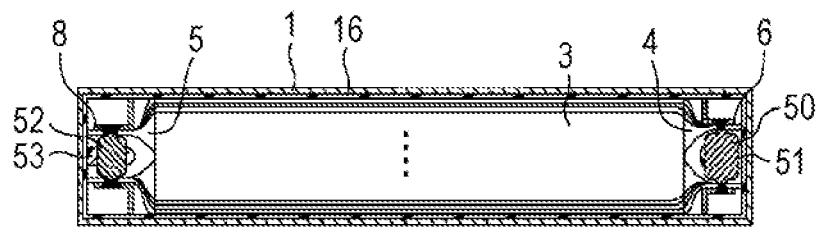
FIG. 2B is a cross-sectional view taken along line IIB-IIB in FIG. 2A.

The structure of a prismatic secondary battery 20, which is a secondary battery according to an embodiment, will be described below. The present invention is not limited to the following embodiment.

As illustrated in FIG. 1A, FIG. 1B, and FIGS. 2A to 2C, the prismatic secondary battery 20 has a battery case 100. The battery case 100 includes a bottomed cylindrical prismatic outer body 1 having an opening, and a sealing plate 2 that seals the opening of the prismatic outer body 1. The prismatic outer body 1 and the sealing plate 2 are preferably each made of metal, and preferably made of, for example, aluminum or an aluminum alloy. The prismatic outer body 1 contains, together with an electrolyte, a flat electrode body 3 including a positive electrode plate and a negative electrode plate that are wound with a separator interposed therebetween.

The electrode body 3 has a wound positive electrode core-exposed portion 4 at one end and a wound negative electrode core-exposed portion 5 at the other end. A positive electrode current collector 6 is connected to the positive electrode core-exposed portion 4. The positive electrode current collector 6 is electrically connected to a positive electrode terminal 7 attached to the sealing plate 2. A negative electrode current collector 8 is connected to the negative electrode core-exposed portion 5. The negative electrode current collector 8 is electrically connected to a negative electrode terminal 9 attached to the sealing plate 2. The positive electrode current collector 6, the positive electrode terminal 7, the negative electrode current collector 8, and the negative electrode terminal 9 are each made of metal.

An external insulating member 10 made of resin is disposed between the positive electrode terminal 7 and the sealing plate 2. An external insulating member 11 made of resin is disposed between the negative electrode terminal 9 and the sealing plate 2. An internal insulating member 12 made of resin is disposed between the sealing plate 2 and the negative electrode current collector 8.

The sealing plate 2 has an electrolyte injection port 13. The electrolyte injection port 13 is sealed with a sealing member 14. The sealing plate 2 has a gas release valve 15. The gas release valve 15 fractures upon an increase in the internal pressure of the battery case 100 to a predetermined value or higher and releases gas in the battery case 100 to the outside of the battery case 100.

An insulating sheet 16 made of resin is disposed between the prismatic outer body 1 and the electrode body 3. The insulating sheet 16 is formed in a bag shape or a box shape and contains the electrode body 3 inside.

The conduction path between the positive electrode plate and the positive electrode terminal 7 is provided with a current interrupting mechanism 30. The current interrupting mechanism 30 operates when an abnormal event occurs in the prismatic secondary battery 20 to increase the internal pressure of the battery case 100 to a predetermined value or higher. The operation of the current interrupting mechanism 30 causes disconnection of the conduction path between the positive electrode plate and the positive electrode terminal 7.

The operating pressure of the current interrupting mechanism 30 is lower than the operating pressure of the gas release valve 15.

The wound positive electrode core-exposed portion 4 is divided into two sections from the central part, and intermediate conductive members 50 made of metal are disposed between two sections. Two intermediate conductive members 50 are held by holding members 51 made of resin. Welds 60 are formed at the connection parts between the positive electrode current collector 6, the positive electrode core-exposed portion 4, and the intermediate conductive members 50.

The wound negative electrode core-exposed portion 5 is divided into two sections from the central part, and the intermediate conductive members 52 made of metal are disposed between two sections. Two intermediate conductive members 52 are held by holding members 53 made of resin. Welds (not illustrated) are formed at the connection parts between the negative electrode current collector 8, the negative electrode core-exposed portion 5, and the intermediate conductive members 52.

Next, a method for producing the prismatic secondary battery 20, and the components of the prismatic secondary battery 20 will be described below in detail.

Positive Electrode Plate

A positive electrode active material mixture layer containing a positive electrode active material is formed on each surface of a positive electrode core made of metal foil to provide a strip-shaped positive electrode plate. The positive electrode plate has a positive electrode core-exposed portion 4 in an edge part in the width direction. The positive electrode core-exposed portion 4 has no positive electrode active material mixture layer on each surface and extends in the longitudinal direction of the positive electrode plate. The positive electrode core is preferably made of, for example, aluminum foil or aluminum alloy foil. The positive electrode active material is preferably a lithium-transition metal composite oxide. The positive electrode active material mixture layer preferably contains a binder, such as polyvinylidene fluoride, and a conductive agent composed of a carbon material and other materials.

Negative Electrode Plate

A negative electrode active material mixture layer containing a negative electrode active material is formed on each surface of a negative electrode core made of metal foil to provide a strip-shaped negative electrode plate. The negative electrode plate has a negative electrode core-exposed portion 5 in an edge part in the width direction. The negative electrode core-exposed portion 5 has no negative electrode active material mixture layer on each surface and extends in the longitudinal direction of the negative electrode plate. The negative electrode core is preferably made of, for example, copper foil or copper alloy foil. The negative electrode active material is preferably, for example, a carbon material or a silicon material. The negative electrode active material mixture layer preferably contains a binder, such as carboxymethylcellulose (CMC) or styrene-butadiene rubber (SBR).

Electrode Body

A strip-shaped positive electrode plate and a strip-shaped negative electrode plate are wound with a strip-shaped separator interposed therebetween, and formed in a flat shape to provide a flat electrode body 3. In the electrode body 3, the wound positive electrode core-exposed portion 4 is disposed in one edge part in the direction in which the winding axis extends, and the wound negative electrode core-exposed portion 5 is disposed in the other edge part.

The separator is preferably a fine porous membrane. The separator is preferably a polyolefin separator.

Current Interrupting Mechanism

Figure 3:
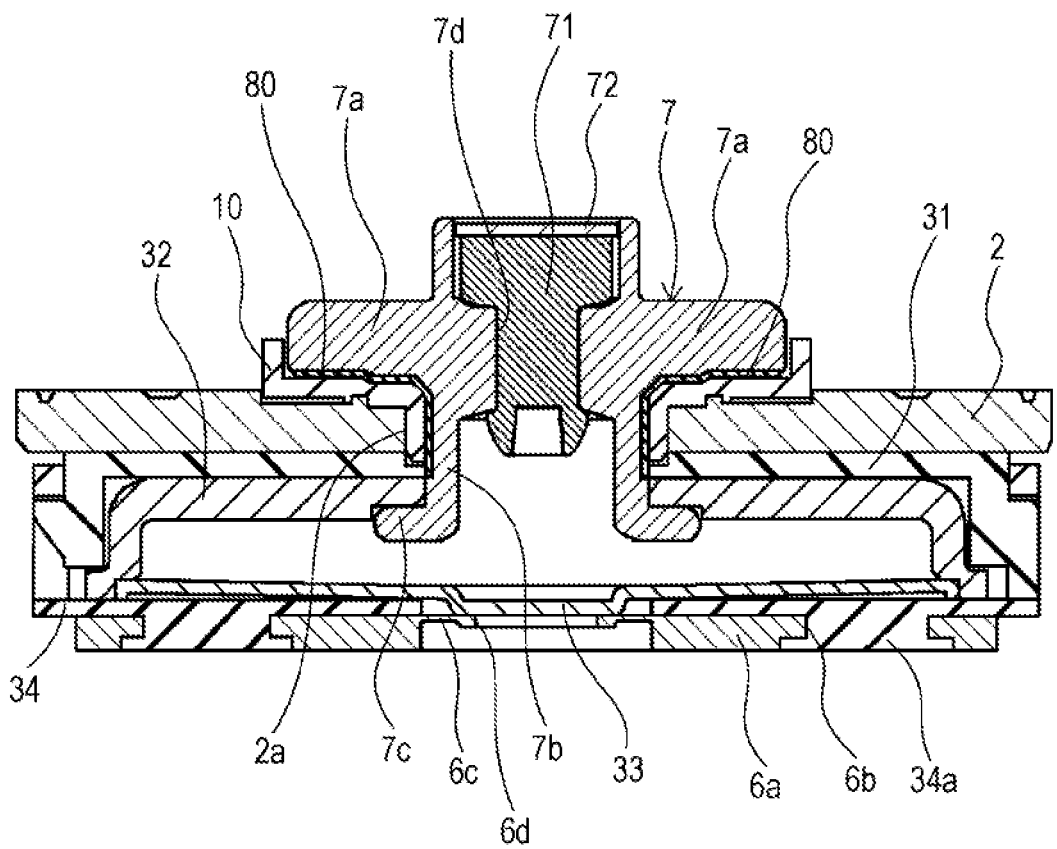
FIG. 3 is a cross-sectional view of a current interrupting mechanism and the surrounding area in the transverse direction of the sealing plate.
Figure 4:
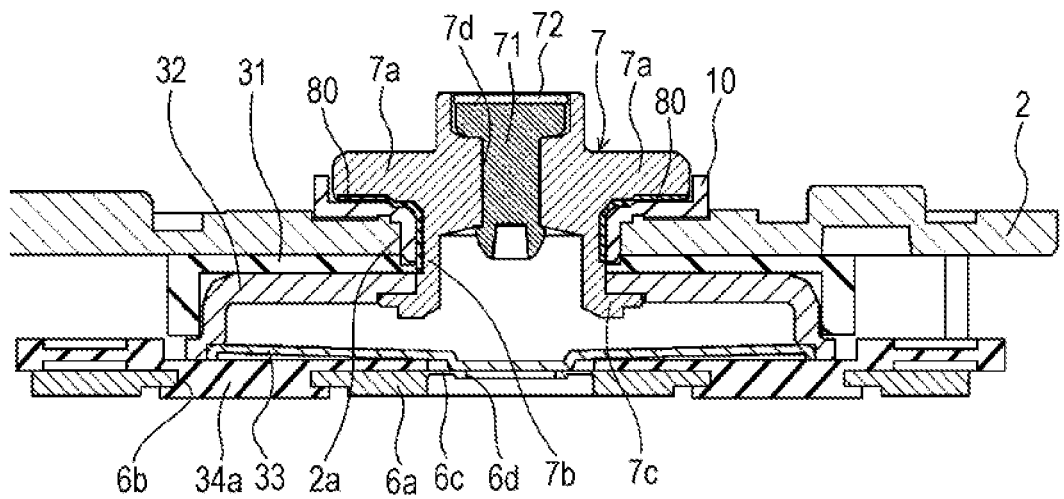
FIG. 4 is a cross-sectional view of the current interrupting mechanism and the surrounding area in the longitudinal direction of the sealing plate.
Figure 5:
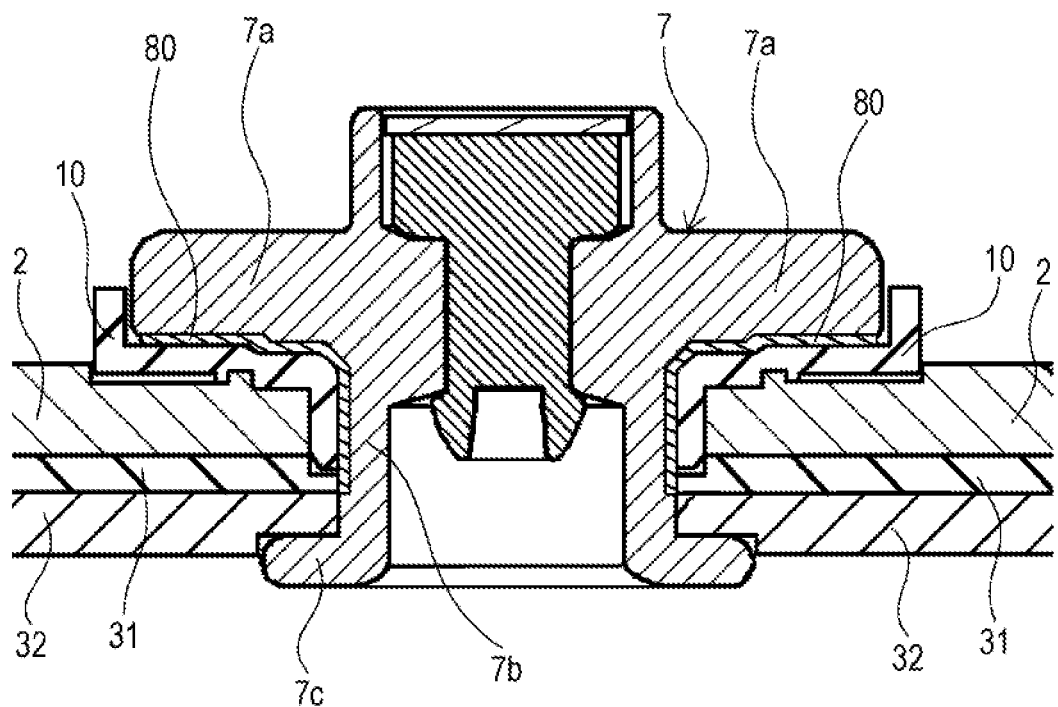
FIG. 5 is an enlarged view of a positive electrode terminal and the surrounding area in FIG. 3.

Referring to FIG. 3 and FIG. 4, a method for attaching the positive electrode terminal 7 to the sealing plate 2, a method for producing the current interrupting mechanism 30, and the structure of the current interrupting mechanism 30 will be described.

The external insulating member 10 is disposed on the battery outer side around the positive electrode terminal attachment hole 2a of the sealing plate 2. A first insulating member 31 and a conductive member 32 are disposed on the battery inner side around the positive electrode terminal attachment hole 2a of the sealing plate 2. The positive electrode terminal 7 is inserted from the battery outer side into the through-hole of the external insulating member 10, the positive electrode terminal attachment hole 2a, the through-hole of the first insulating member 31, and the through-hole of the conductive member 32. The end of the positive electrode terminal 7 is crimped onto the conductive member 32. The positive electrode terminal 7, the external insulating member 10, the first insulating member 31, and the conductive member 32 are thus fixed to the sealing plate 2. The positive electrode terminal 7 has a flange part 7a, an insertion part 7b, and a crimped part 7c. The flange part 7a is disposed on the battery outer side with respect to the sealing plate 2. The insertion part 7b extends from the flange part 7a to the battery inner side. The crimped part 7c is formed on the end side of the insertion part 7b. The crimped part 7c is preferably welded to the conductive member 32. The first insulating member 31 is a resin member. The sealing plate 2 is electrically insulated from the positive electrode terminal 7 and the conductive member 32 by the external insulating member 10 and the first insulating member 31.

The conductive member 32 is made of metal and has a cup shape. The conductive member 32 has a region parallel to the sealing plate 2, and a cylindrical region. The cylindrical region has an opening adjacent to the electrode body 3. The cross-sectional shape of the cylindrical region in the direction parallel to the sealing plate 2 may be circular or rectangular.

The positive electrode terminal 7 has a terminal through-hole 7d. The leak inspection of each connection part can be carried out by flowing gas from the terminal through-hole 7d into the current interrupting mechanism 30. The terminal through-hole 7d is sealed with a rubber member 71. The outer surface of the rubber member 71 is preferably provided with a metal plate 72.

The opening of the conductive member 32 adjacent to the electrode body 3 is sealed with a deformation plate 33 made of metal. A positive electrode current collector 6 is connected to the surface of the deformation plate 33 adjacent to the electrode body 3. A second insulating member 34 made of resin is disposed between the deformation plate 33 and the positive electrode current collector 6. The second insulating member 34 is preferably connected to the first insulating member 31.

The positive electrode current collector 6 has a base part 6a located between the sealing plate 2 and the electrode body 3. The base part 6a has a fixation opening 6b. A fixation protrusion 34a of the second insulating member 34 is inserted into the fixation opening 6b. The diameter of the end of the fixation protrusion 34a is enlarged by hot crimping or the like, so that the second insulating member 34 is fixed to the base part 6a of the positive electrode current collector 6.

The base part 6a of the positive electrode current collector 6 has a thin portion 6c. The thin portion 6c has a current collector opening 6d at its center. The positive electrode current collector 6 is weld-connected to the deformation plate 33 at the periphery of the current collector opening 6d.

When the internal pressure of the battery case 100 reaches a predetermined value or higher, the deformation plate 33 deforms such that the central part of the deformation plate 33 approaches the positive electrode terminal 7. The deformation of the deformation plate 33 causes the thin portion 6c of the positive electrode current collector 6 to fracture and thus disconnects the conduction path between the positive electrode plate and the positive electrode terminal 7. Preferably, the thin portion 6c has an annular notch and fractures at the annular notch.

An electrically insulating, intermediate heat-resistant layer 80 is disposed on a portion of the positive electrode terminal 7 that faces the sealing plate 2 through the external insulating member 10.

Attachment of Negative Electrode Terminal to Sealing Plate

The external insulating member 11 is disposed on the battery outer side around the negative electrode terminal attachment hole of the sealing plate 2. The internal insulating member 12 and the negative electrode current collector 8 are disposed on the battery inner side around the negative electrode terminal attachment hole of the sealing plate 2. The negative electrode terminal 9 is then inserted from the battery outer side into the through-hole of the external insulating member 11, the negative electrode terminal attachment hole, the through-hole of the internal insulating member 12, and the through-hole of the negative electrode current collector 8. The end of the negative electrode terminal 9 is crimped onto the negative electrode current collector 8. The negative electrode terminal 9, the external insulating member 11, the internal insulating member 12, and the negative electrode current collector 8 are fixed to the sealing plate 2. The crimped portion of the negative electrode terminal 9 is preferably welded to the negative electrode current collector 8.

Attachment of Electrode Body to Current Collector

The positive electrode current collector 6 is welded to each outer surface of the wound positive electrode core-exposed portion 4. The negative electrode current collector 8 is welded to each outer surface of the wound negative electrode core-exposed portion 5.

Assembly of Prismatic Secondary Battery

The electrode body 3 is covered with the insulating sheet 16 that has been bent and formed into a box shape. The electrode body 3 is then inserted into the prismatic outer body 1. The sealing plate 2 is welded to the prismatic outer body 1 such that the opening of the prismatic outer body 1 is closed with the sealing plate 2. An electrolyte is then injected into the battery case 100 through the electrolyte injection port 13 of the sealing plate 2. The electrolyte injection port 13 is then sealed with the sealing member 14 composed of a blind rivet or the like. The prismatic secondary battery 20 is produced in this way.

Battery Pack

Figure 6:
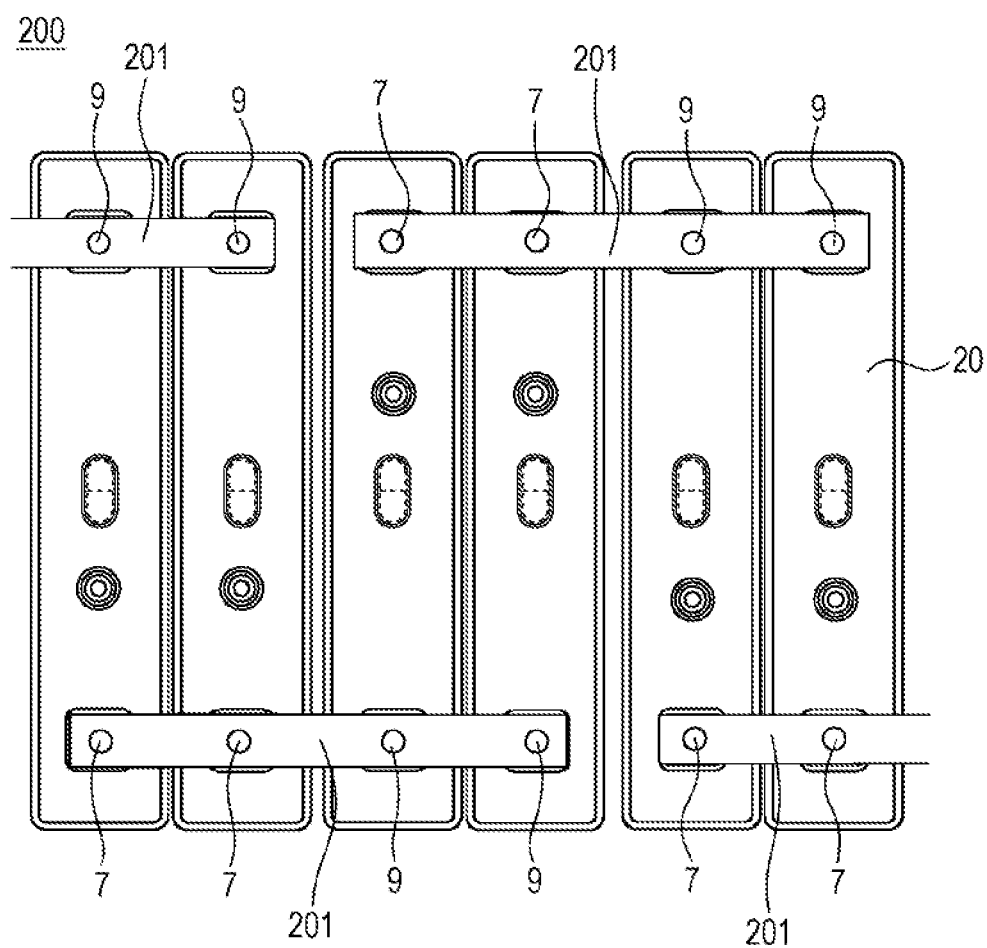
FIG. 6 is a top view of a battery pack including a plurality of the prismatic secondary batteries according to the embodiment.

A battery pack can be produced by connecting the prismatic secondary batteries 20 according to the embodiment in parallel. FIG. 6 is a top view of a battery pack 200 including two batteries in parallel×three units in series, where three units of two prismatic secondary batteries 20 connected in parallel are connected in series. The positive electrode terminals 7 or the negative electrode terminals 9 of the prismatic secondary batteries 20 are connected by using busbars 201 made of metal. As not illustrated in the figure, the battery pack 200 may have end plates at the opposed ends, and the end plates can be connected to each other by using binding bars. Moreover, an insulating spacer, such as an insulating sheet, can be disposed between the adjacent prismatic secondary batteries 20. The number of the prismatic secondary batteries 20 connected in parallel can also be changed appropriately. The number of series-connected units of the prismatic secondary batteries 20 connected in parallel can also be changed appropriately. The battery pack may be composed only of the prismatic secondary batteries 20 connected in parallel.

A battery pack known in the related art may undergo the following phenomena when an internal short circuit occurs in one of the prismatic secondary batteries 20 connected in parallel.

The internal pressure of the battery case 100 of the prismatic secondary battery 20 in which an internal short circuit has occurred increases as the temperatures increases rapidly. Since the prismatic secondary batteries 20 are connected in parallel, a current flows into the prismatic secondary battery 20 in which the internal short circuit has occurred from other prismatic secondary batteries 20. Thus, the prismatic secondary batteries 20 in the case where an internal short circuit occurs in the prismatic secondary batteries 20 connected in parallel tends to reach a high temperature more rapidly and tends to reach a higher temperature than those in the case where an internal short circuit occurs in the prismatic secondary batteries 20 that are not connected in parallel.

In the prismatic secondary battery 20 in which the internal short circuit has occurred, the current interrupting mechanism 30 operates in response to an increase in the internal pressure of the battery case 100. The operation of the current interrupting mechanism 30 causes disconnection of the conduction path between the positive electrode plate and the positive electrode terminal 7 and thus terminates the current flow from other prismatic secondary batteries 20 into the prismatic secondary battery 20 in which the internal short circuit has occurred.

However, there is a case where the prismatic secondary battery 20 in which an internal short circuit has occurred reaches a very high temperature. In this case, the high temperature may lead to melting of the external insulating member 10 made of resin, which insulates between the positive electrode terminal 7 and the sealing plate 2, and the external insulating member 11 made of resin, which insulates between the negative electrode terminal 9 and the sealing plate 2. If the external insulating member 10 and the external insulating member 11 melt, the positive electrode terminal 7 and the negative electrode terminal 9 both come into contact with the sealing plate 2. This forms a conduction path of positive electrode terminal 7-sealing plate 2-negative electrode terminal 9 and thus forms a closed circuit with the prismatic secondary batteries 20 connected in parallel. As a result, a large current may flow again into the prismatic secondary batteries 20 connected in parallel, and an abnormal event may occur in prismatic secondary batteries 20 different from the prismatic secondary battery 20 in which a short circuit has occurred.

In the prismatic secondary battery 20 according to the embodiment, the electrically insulating, intermediate heat-resistant layer 80 is disposed on a portion of the positive electrode terminal 7 that faces the sealing plate 2 through the external insulating member 10. Even if the prismatic secondary battery 20 reaches a high-temperature state and the external insulating member 10 melts, such a configuration can avoid electrical connection between the positive electrode terminal 7 and the sealing plate 2. Therefore, even if an internal short circuit occurs in the prismatic secondary batteries 20 connected in parallel as described above, a conduction path is formed separately after operation of the current interrupting mechanism 30. This can avoid a large current from flowing into other prismatic secondary batteries 20.

The prismatic secondary battery 20 according to the embodiment is an example in which the electrically insulating, intermediate heat-resistant layer 80 is disposed on the positive electrode terminal 7. The prismatic secondary battery 20 may include an electrically insulating, intermediate heat-resistant layer on the negative electrode terminal 9. In other words, the prismatic secondary battery 20 may have a structure in which at least one of electrical insulation between the positive electrode terminal 7 and the sealing plate 2 and electrical insulation between the negative electrode terminal 9 and the sealing plate 2 is made when the external insulating member 10 on the positive electrode side and the external insulating member 11 on the negative electrode side melt.

The electrically insulating, intermediate heat-resistant layer disposed on the surface of the positive electrode terminal 7 or the negative electrode terminal 9 can solve the above-described issue while effectively avoiding a decrease in the sealability of the secondary battery with a simple method.

The electrically insulating, intermediate heat-resistant layer 80 preferably has a melting point of 400° C. or higher and more preferably has a melting point of 500° C. or higher. In the case where the electrically insulating, intermediate heat-resistant layer 80 contains two or more materials, all of the materials does not necessarily have a melting point of 400° C. or higher. The electrically insulating, intermediate heat-resistant layer 80 preferably contains a material having a melting point of 400° C. or higher. The melting point of a main material (a material that accounts for the greatest proportion of volume) of the electrically insulating, intermediate heat-resistant layer 80 is preferably 400° C. or higher.

The resistibility of the electrically insulating, intermediate heat-resistant layer 80 is preferably $1.0 \times 10^4$ Ω·cm or higher under a condition of 400° C., and more preferably $1.0 \times 10^5$ Ω·cm or higher under a condition of 400° C.

The thickness of the electrically insulating, intermediate heat-resistant layer 80 is preferably 5 μm or more, more preferably 10 μm or more, and still more preferably 20 μm or more.

The electrically insulating, intermediate heat-resistant layer 80 may be an oxide coating film or a nitride coating film formed on the surface of the positive electrode terminal 7. In particular, the electrically insulating, intermediate heat-resistant layer 80 is preferably an oxide coating film. For example, the positive electrode terminal 7 may be made of aluminum or an aluminum alloy, and may have an aluminum oxide coating film on its surface. The electrically insulating, intermediate heat-resistant layer 80 is preferably an alumite layer.

The electrically insulating, intermediate heat-resistant layer 80 may be provided by forming a layer containing a binder and ceramic particles or ceramic fiber made of alumina, zirconia, titania, or silica on the surface of the positive electrode terminal 7. The electrically insulating, intermediate heat-resistant layer 80 may be provided as follows: applying, to the surface of the positive electrode terminal 7, a slurry containing ceramic particles or ceramic fiber, a binder, and a dispersion medium; and drying the slurry to remove the dispersion medium. The presence of ceramic particles or ceramic fiber and a binder in the electrically insulating, intermediate heat-resistant layer 80 is preferred because cracks or the like is unlikely to be generated in the electrically insulating, intermediate heat-resistant layer 80. In the case where the electrically insulating, intermediate heat-resistant layer 80 contains ceramic particles or ceramic fiber and a binder, the proportion of the ceramic particles or ceramic particles in the electrically insulating, intermediate heat-resistant layer 80 is preferably 50 vol % or more, more preferably 60 vol % or more, and still more preferably 70 vol % or more.

The binder may be an inorganic adhesive. Examples of the inorganic adhesive include those based on alkali metal silicates, phosphates, and silica sols. The binder may be a resin binder.

Alternatively, the electrically insulating, intermediate heat-resistant layer 80 may be provided by forming a ceramic layer on the surface of the positive electrode terminal 7 by means of, for example, vapor deposition or baking finish. Alternatively, the electrically insulating, intermediate heat-resistant layer 80 may be provided by application or electrodeposition of a high-heat-resistant resin, such as a fluororesin or an imide resin, on the surface of the positive electrode terminal 7. Alternatively, the electrically insulating, intermediate heat-resistant layer 80 may be provided by integrally molding the positive electrode terminal 7 and a high-heat-resistant resin, such as a fluororesin or an imide resin, or attaching a film made of a high-heat-resistant resin, such as a fluororesin or an imide resin, to the positive electrode terminal 7.

Preferably, no electrically insulating, intermediate heat-resistant layer 80 is disposed on the upper surface (the surface away from the sealing plate 2) of the flange part 7a of the positive electrode terminal 7. Preferably, no electrically insulating, intermediate heat-resistant layer 80 is disposed on the crimped part 7c of the positive electrode terminal 7.

An electrically insulating, intermediate heat-resistant layer may be disposed on a portion of the conductive member 32 that faces the sealing plate 2 through the first insulating member 31, on a portion of the sealing plate 2 that faces the conductive member 32 through the first insulating member 31, or on the first insulating member 31.

Modification 1

Figure 7:
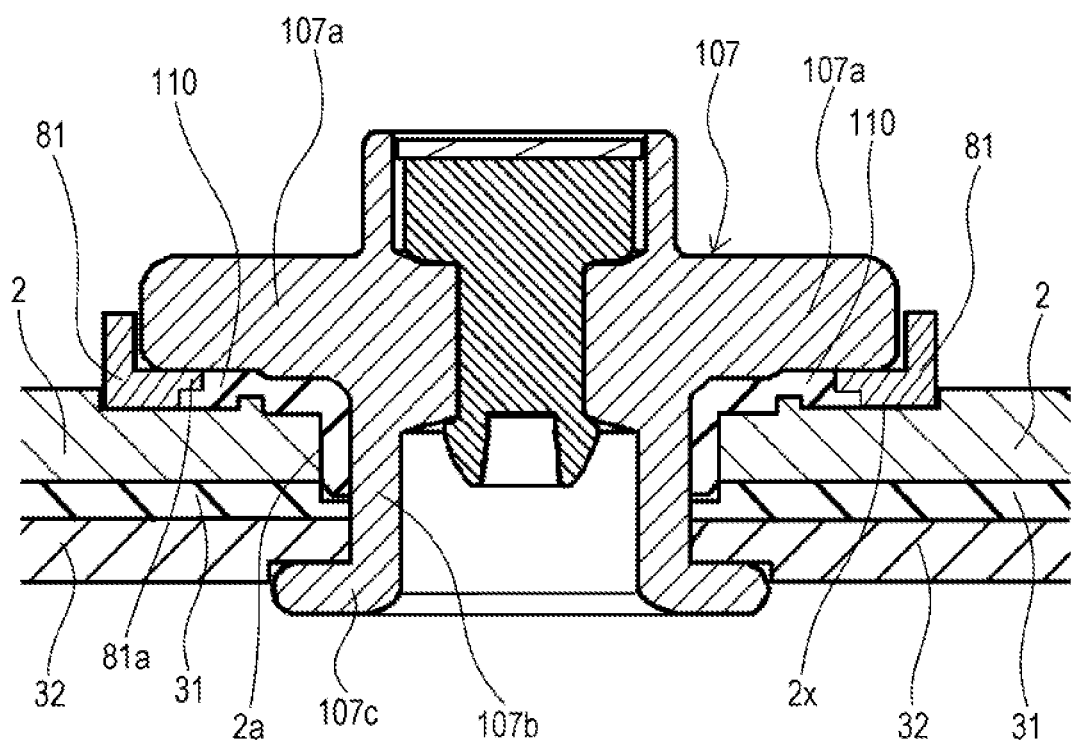
FIG. 7 is a view corresponding to FIG. 5 for a prismatic secondary battery according to Modification 1.

As illustrated in FIG. 7, a prismatic secondary battery according to Modification 1 includes a ceramic member 81, which is an electrically insulating, intermediate heat-resistant member, between the positive electrode terminal 107 and the sealing plate 2. The ceramic member 81 is preferably made of, for example, alumina, titania, silica, zirconia, or glass.

Even if the prismatic secondary battery according to Modification 1 reaches a high-temperature state and the external insulating member 110 made of resin melts, the presence of the ceramic member 81 between the positive electrode terminal 107 and the sealing plate 2 can avoid contact between the positive electrode terminal 107 and the sealing plate 2.

As viewed in the direction perpendicular to the sealing plate 2, the ceramic member 81 preferably has a region 81a that overlaps the external insulating member 110. Such a configuration allows a long creepage distance from the positive electrode terminal 107 to the sealing plate 2 at a boundary between the external insulating member 110 and the ceramic member 81 during normal use of the prismatic secondary battery 20. This configuration thus can assuredly avoid electrical connection between the positive electrode terminal 107 and the sealing plate 2 due to dew or the like.

The external insulating member 110 made of resin preferably has one surface in contact with the positive electrode terminal 107 and the other surface in contact with the sealing plate 2. This configuration can ensure the sealability between the positive electrode terminal 107 and the sealing plate 2.

Preferably, as viewed in the direction perpendicular to the sealing plate 2, a region of the external insulating member 110 made of resin in contact with the positive electrode terminal 107 at least partially overlaps a region of the external insulating member 110 made of resin in contact with the sealing plate 2.

The positive electrode terminal 107 has a flange part 107a and an insertion part 107b. The flange part 107a is disposed on the battery outer side with respect to the sealing plate 2. The insertion part 107b extends from the flange part 107a to the battery inner side and is inserted into the positive electrode terminal attachment hole 2a. A crimped part 107c is formed on the end side of the insertion part 107b. The external insulating member 110 has a portion located between the flange part 107a and the outer surface of the sealing plate 2. In the radial direction (left-right direction in FIG. 7) of the positive electrode terminal 107, the ceramic member 81 is located outward of the external insulating member 110. The ceramic member 81 preferably has an annular shape in a plan view.

Preferably, a recess 2x is formed around the positive electrode terminal attachment hole 2a of the sealing plate 2 and on the outer surface of the sealing plate 2, and the ceramic member 81 is placed in the recess 2x. The ceramic member 81 has a first region and a second region. The first region is located along the outer surface of the sealing plate 2, and the second region extends from the first region in the direction away from the sealing plate 2. The first region is located between the flange part 107a and the outer surface of the sealing plate 2. The second region is located so as to face the side surface of the flange part 107a.

Modification 2

Figure 8:
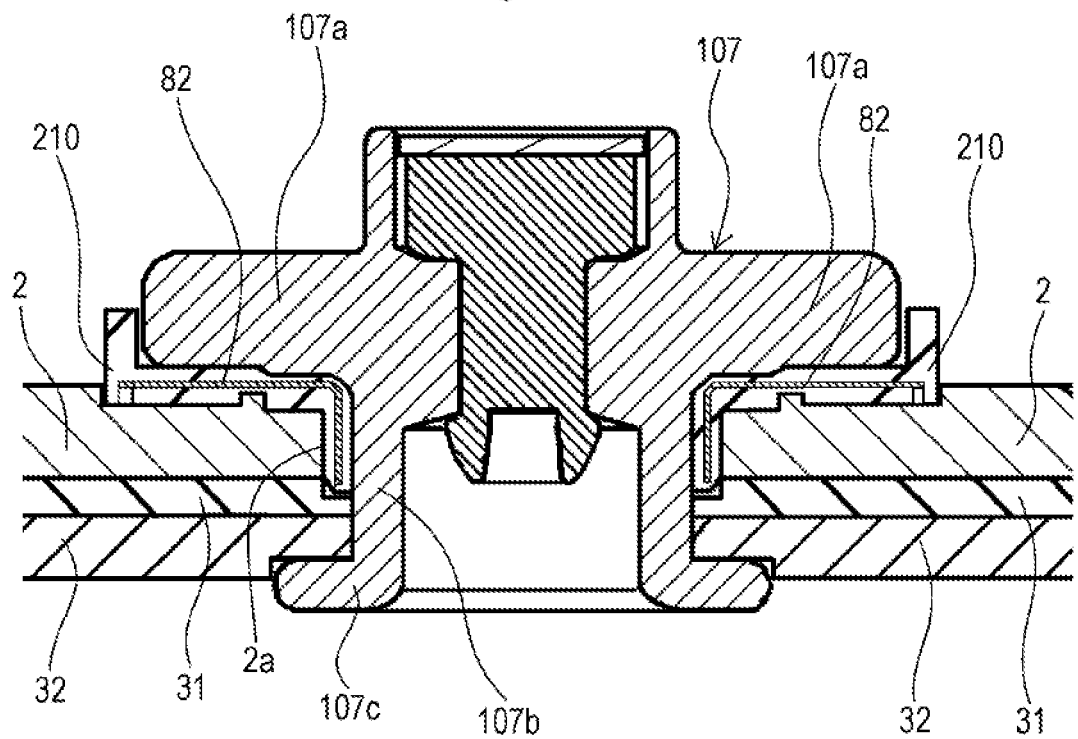
FIG. 8 is a view corresponding to FIG. 5 for a prismatic secondary battery according to Modification 2.

As illustrated in FIG. 8, a prismatic secondary battery according to Modification 2 includes an electrically insulating, intermediate heat-resistant layer 82 inside an external insulating member 210 made of resin. The electrically insulating, intermediate heat-resistant layer 82 is preferably a ceramic layer made of, for example, alumina, titania, silica, zirconia, or glass.

Even if the prismatic secondary battery according to Modification 2 reaches a high-temperature state and the external insulating member 210 made of resin melts, the presence of the electrically insulating, intermediate heat-resistant layer 82 between a positive electrode terminal 107 and a sealing plate 2 can avoid contact between the positive electrode terminal 107 and the sealing plate 2.

A region of the external insulating member 210 having each outer surface made of resin is disposed between the positive electrode terminal 107 and the sealing plate 2. Since the external insulating member 210 has one surface in contact with the positive electrode terminal 107 and a portion of the other surface in contact with the sealing plate 2, such a configuration can ensure the sealability between the positive electrode terminal 107 and the sealing plate 2.

The electrically insulating, intermediate heat-resistant layer 82 preferably has a region located along the outer surface of the sealing plate 2 and a region (a region located between the inner surface of the positive electrode terminal attachment hole 2a of the sealing plate 2 and the insertion part 107b of the positive electrode terminal 107) located along the inner surface of the positive electrode terminal attachment hole 2a of the sealing plate 2. This configuration can assuredly avoid contact between the positive electrode terminal 107 and the sealing plate 2.

The external insulating member 210 may have a portion in which the electrically insulating, intermediate heat-resistant layer 82 is exposed. The provision of the portion in which the electrically insulating, intermediate heat-resistant layer 82 is exposed facilitates formation of the electrically insulating, intermediate heat-resistant layer 82 at a predetermined position in the external insulating member 210. In this case, the portion in which the electrically insulating, intermediate heat-resistant layer 82 is exposed is preferably located radially outward of a protrusion on the outer surface of the sealing plate 2. This configuration can effectively suppress a decrease in sealability between the positive electrode terminal 107 and the sealing plate 2.

Modification 3

A prismatic secondary battery according to Modification 3 includes an electrically insulating, intermediate heat-resistant layer 83 on the surface of a sealing plate 102.

Figure 9:
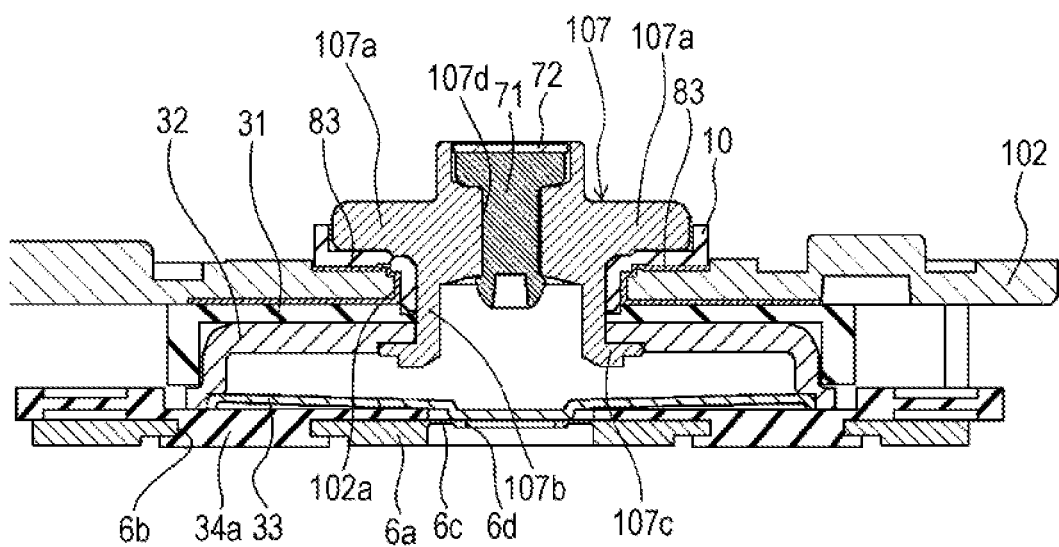
FIG. 9 is a view corresponding to FIG. 4 for a prismatic secondary battery according to Modification 3.

As illustrated in FIG. 9, a positive electrode terminal 107 has a flange part 107a, an insertion part 107b, and a crimped part 107c. A terminal through-hole 107d of the positive electrode terminal 107 is sealed with a rubber member 71. The outer surface of the rubber member 71 is provided with a metal plate 72.

The electrically insulating, intermediate heat-resistant layer 83 is disposed on a part of the outer surface of the sealing plate 102 that faces the positive electrode terminal 107 through the external insulating member 10. This configuration can avoid electrical connection between the positive electrode terminal 107 and the sealing plate 102 even if the external insulating member 10 melts. The electrically insulating, intermediate heat-resistant layer 83 is also disposed on the inner surface of a positive electrode terminal attachment hole 102a of the sealing plate 102. This configuration can effectively avoid contact between the positive electrode terminal 107 and the sealing plate 2 even if the external insulating member 10 melts.

The electrically insulating, intermediate heat-resistant layer 83 is disposed on a part of the inner surface of the sealing plate 102 that faces a conductive member 32 through a first insulating member 31. This configuration can avoid electrical connection between the conductive member 32 and the sealing plate 2 even if the first insulating member 31 melts.

The electrically insulating, intermediate heat-resistant layer 83 is preferably disposed on at least the outer surface of the sealing plate 102 and near the positive electrode terminal attachment hole 102a. The electrically insulating, intermediate heat-resistant layer 83 is not necessarily formed on the inner surface of the positive electrode terminal attachment hole 102a of the sealing plate 102, and the inner surface of the sealing plate 102.

The electrically insulating, intermediate heat-resistant layer 83 may have the same composition as the electrically insulating, intermediate heat-resistant layer 80.

Modification 4

Figure 10:
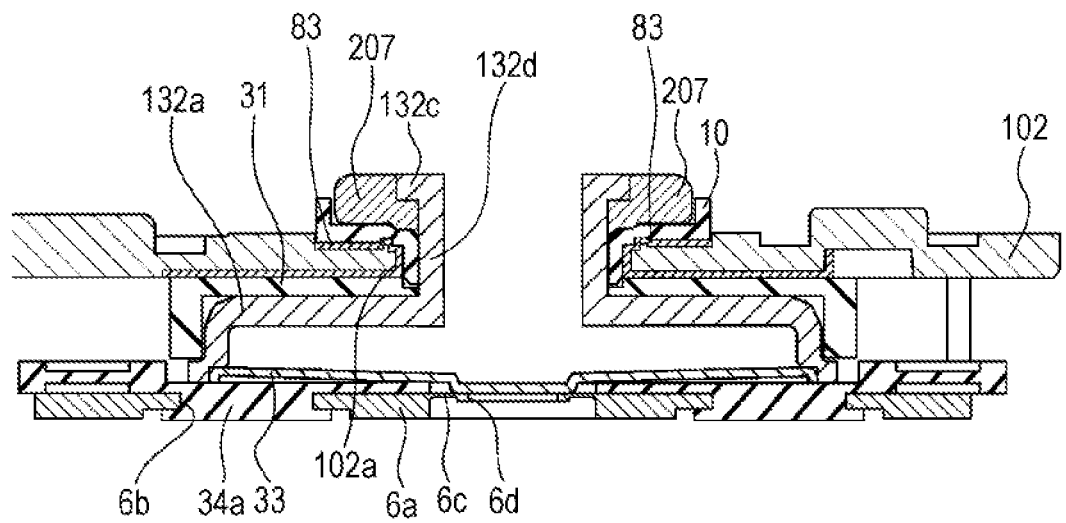
FIG. 10 is a view corresponding to FIG. 4 for a prismatic secondary battery according to Modification 4.

A prismatic secondary battery according to Modification 4, as illustrated in FIG. 10, includes a positive electrode terminal 207 made of metal on the battery outer side with respect to a sealing plate 102. A conductive member 132 includes a body part 132a and an insertion part 132b. The body part 132a is located on the electrode body 3 side with respect to the sealing plate 102. The insertion part 132b extends from the body part 132*a* to the battery outer side. The end of the insertion part 132*b* is inserted into a through-hole of the positive electrode terminal 207 and crimped onto the positive electrode terminal 207 to form a crimped part 132*c*.

The electrically insulating, intermediate heat-resistant layer 83 is disposed on a region of the outer surface of the sealing plate 102 that faces the positive electrode terminal 207 through the external insulating member 10 made of resin. The electrically insulating, intermediate heat-resistant layer 83 is disposed on the inner surface of a positive electrode terminal attachment hole 102*a* of the sealing plate 102. The electrically insulating, intermediate heat-resistant layer 83 is disposed on a region of the inner surface of the sealing plate 102 that faces the body part 132*a* of the conductive member 132 through a first insulating member 31 made of resin.

Modification 5

A prismatic secondary battery according to Modification 5 has no current interrupting mechanism but has a positive electrode current collector including a fuse part.

Figure 11:
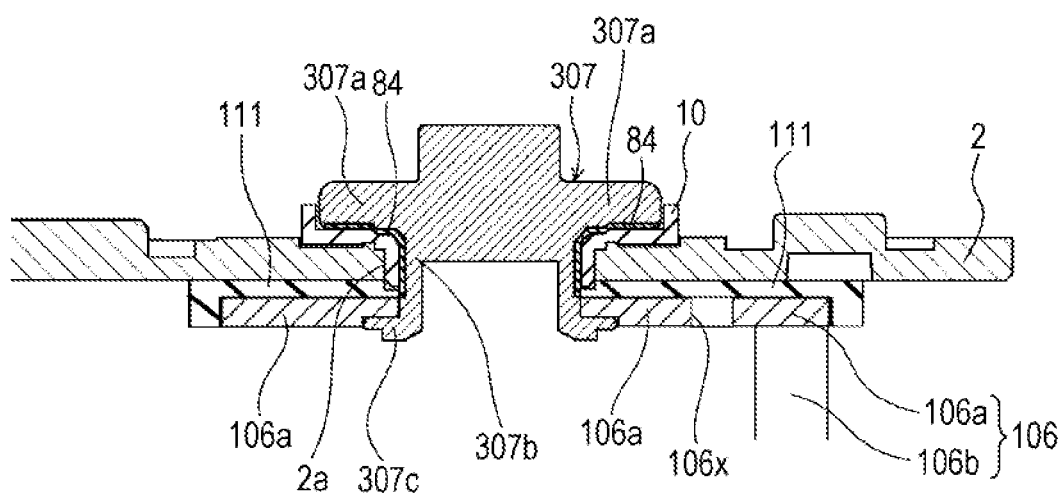
FIG. 11 is a view corresponding to FIG. 4 for a prismatic secondary battery according to Modification 5.

As illustrated in FIG. 11, an external insulating member 10 is disposed on the battery outer side around a positive electrode terminal attachment hole 2*a* of a sealing plate 2. An internal insulating member 111 and a base part 106*a* of a positive electrode current collector 106 are disposed on the battery inner side around the positive electrode terminal attachment hole 2*a* of the sealing plate 2. The external insulating member 10 and the internal insulating member 111 are each made of resin. The positive electrode terminal 307 has a flange part 307*a* and an insertion part 307*b*. The flange part 307*a* is located on the battery outer side with respect to the sealing plate 2. The insertion part 307*b* extends from the flange part 307*a* to the battery inner side. The insertion part 307*b* is inserted from the battery outer side into the through-hole of the external insulating member 10, the positive electrode terminal attachment hole 2*a*, the through-hole of the internal insulating member 111, and the through-hole of the base part 106*a* of the positive electrode current collector 106. The end of the insertion part 307*b* is crimped to form a crimped part 307*c*. The crimped part 307*c* is preferably welded to the flange part 307*a*.

The positive electrode current collector 106 has a lead part 106*b*, which extends from the base part 106*a* toward the electrode body 3 and is connected to a positive electrode core-exposed portion 4. The positive electrode current collector 106 has a fuse part 106*x*. The fuse part 106*x* can be formed by providing the positive electrode current collector 106 with, for example, an opening, a cutout, or a thin portion, that is, a part having a smaller cross-sectional area than other parts.

If an internal short circuit occurs in one prismatic secondary battery in a battery pack including prismatic secondary batteries connected in parallel, a current flows into the prismatic secondary battery in which the internal short circuit has occurred from other prismatic secondary batteries, and the fuse part 106*x* melts and breaks. However, there is a possibility that the prismatic secondary battery in which the internal short circuit has occurred reaches a high-temperature state, and the external insulating member 10 on the positive electrode side and an external insulating member 11 on the negative electrode side melt to form a conduction path of positive electrode terminal-sealing plate-negative electrode terminal.

In the prismatic secondary battery according to Modification 5, an electrically insulating, intermediate heat-resistant layer 84 is disposed on a region of the positive electrode terminal 307 that faces the sealing plate 2 through the external insulating member 10. This configuration can avoid electrical connection between the positive electrode terminal 307 and the sealing plate 2 even if the external insulating member 10 melts.

Modification 6

Figure 12:
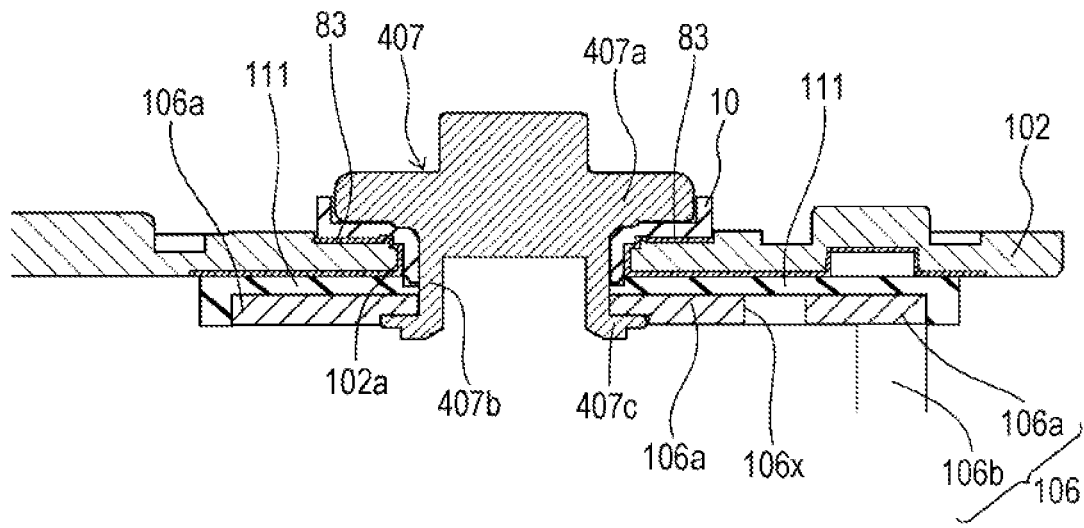
FIG. 12 is a view corresponding to FIG. 4 for a prismatic secondary battery according to Modification 6.

The prismatic secondary battery according to Modification 5 includes the electrically insulating, intermediate heat-resistant layer 84 on the positive electrode terminal 307, while a prismatic secondary battery according to Modification 6 includes an electrically insulating, intermediate heat-resistant layer 83 on a sealing plate 102. As illustrated in FIG. 12, a positive electrode terminal 407 has a flange part 407*a*, an insertion part 407*b*, and a crimped part 407*c*. The electrically insulating, intermediate heat-resistant layer 83 is disposed on a region of the outer surface of the sealing plate 102 that faces the positive electrode terminal 407 through the external insulating member 10. The electrically insulating, intermediate heat-resistant layer 83 is disposed on the inner surface of a positive electrode terminal attachment hole 102*a* of the sealing plate 102. The electrically insulating, intermediate heat-resistant layer 83 is disposed on a region of the inner surface of the sealing plate 102 that faces a base part 106*a* of a positive electrode current collector 106 through an internal insulating member 111.

Modification 7

Figure 13:
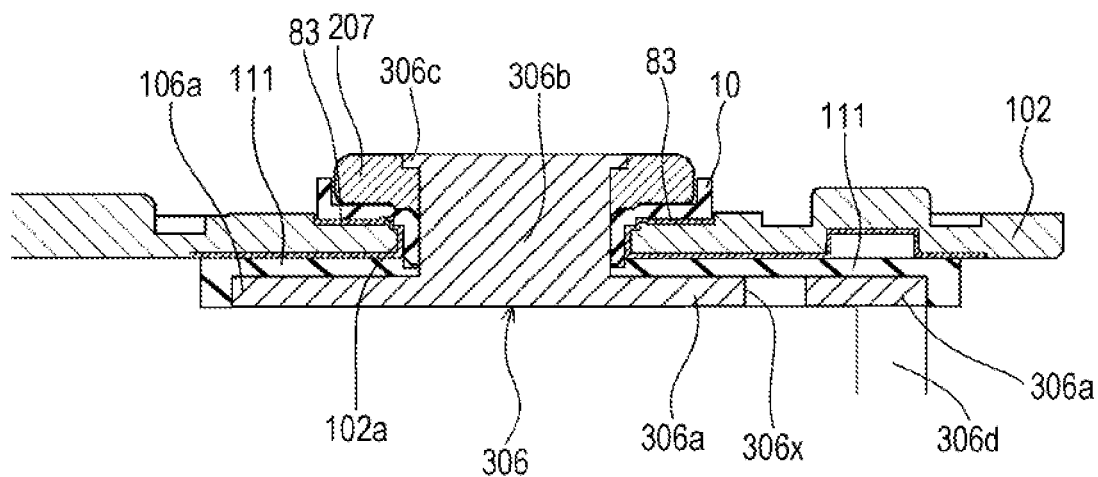
FIG. 13 is a view corresponding to FIG. 4 for a prismatic secondary battery according to Modification 7.

A prismatic secondary battery according to Modification 7, as illustrated in FIG. 13, includes a positive electrode terminal 207 on the battery outer side with respect to a sealing plate 102. An external insulating member 10 made of resin is disposed between the sealing plate 102 and the positive electrode terminal 207. The positive electrode current collector 306 includes a base part 306*a* and an insertion part 306*b*. The base part 306*a* is located between the sealing plate 102 and an electrode body 3. The insertion part 306*b* extends from the base part 306*a* to the battery outer side. The insertion part 306*b* is inserted into the through-hole of an internal insulating member 111 made of resin, a positive electrode terminal attachment hole 102*a*, the through-hole of the external insulating member 10, and the through-hole of the positive electrode terminal 207. The insertion part 306*b* is crimped onto the positive electrode terminal 207 to form a crimped part 306*c*. The positive electrode current collector 306 has a lead part 306*d*, which extends from the base part 306*a* toward the electrode body 3. The positive electrode current collector 306 has a fuse part 306*x*.

An electrically insulating, intermediate heat-resistant layer 83 is disposed on a region of the outer surface of the sealing plate 102 that faces the positive electrode terminal 207 through the external insulating member 10. The electrically insulating, intermediate heat-resistant layer 83 is disposed on the inner surface of a positive electrode terminal attachment hole 102*a* of the sealing plate 102. The electrically insulating, intermediate heat-resistant layer 83 is disposed on a region of the inner surface of the sealing plate 102 that faces the base part 306*a* of the positive electrode current collector 306 through the internal insulating member 111.

Modification 8

The external insulating member (10, 110) made of resin between the positive electrode terminal and the sealing plate may contain ceramic particles or ceramic fiber. For example, the proportion of the ceramic particles or ceramic fiber in a surface area of the external insulating member 10 in contact with the positive electrode terminal 7 and in a surface area of the external insulating member 10 in contact with the sealing plate 2 is preferably smaller than the proportion of the ceramic particles or ceramic fiber in a central area of the external insulating member 10 in the thickness direction. Such a configuration can effectively suppress a decrease in the sealability of the prismatic secondary battery.

The external insulating member 10 may have a multilayer structure in which a central layer contains ceramic particles or ceramic fiber and the opposed outer surface layers are free of ceramic particles or ceramic fiber. Alternatively, the proportion of the ceramic particles or ceramic fiber in the opposed outer surface layers may be smaller than the proportion of the ceramic particles or ceramic fiber in the central layer. For example, the proportion of the ceramic particles or ceramic fiber in the opposed outer surface layers is preferably one-third or less and more preferably one-fifth or less of the proportion of the ceramic particles or ceramic fiber in the central layer.

Because of the presence of the ceramic particles or ceramic fiber in the external insulating member (10, 110) made of resin, a positive electrode terminal and a sealing plate may have no electrically insulating, intermediate heat-resistant layer in the case where the contact between the positive electrode terminal and the sealing plate can be avoided even if the resin that constitutes the external insulating member (10, 110) melts.

The first insulating member 31 made of resin or the internal insulating member 111 made of resin may contain ceramic particles or ceramic fiber.

Others

The embodiment and Modifications 1 to 8 described above illustrate examples in which an electrically insulating, intermediate heat-resistant layer is disposed on the positive electrode side or an example in which an electrically insulating, intermediate heat-resistant member is disposed on the positive electrode side. However, an electrically insulating, intermediate heat-resistant layer may be disposed on the negative electrode side, or an electrically insulating, intermediate heat-resistant member may be disposed on the negative electrode side. In other words, an insulating member made of resin is disposed in at least one of a space between the positive electrode terminal and the sealing plate and a space between the negative electrode terminal and the sealing plate. Such a configuration avoids formation of a conduction path of positive electrode terminal-sealing plate-negative electrode terminal even if the insulating member melts.

The embodiment and Modifications 1 to 8 illustrate examples in which the positive electrode terminal and the negative electrode terminal are electrically insulated from the sealing plate. However, at least one of the positive electrode terminal and the negative electrode terminal may be electrically connected to the sealing plate.

The components that are not described in Modifications 1 to 8 may be the same as those in the prismatic secondary battery 20 according to the embodiment.

The structure of the electrode body is not limited. The electrode body may be an electrode body including a strip-shaped positive electrode plate and a strip-shaped negative electrode plate that are wound with a strip-shaped separator interposed therebetween. The electrode body may be a stacked electrode body including positive electrode plates and negative electrode plates that are stacked with separators each interposed therebetween. A plurality of electrode bodies may be placed in the battery case.

The insulating member between the positive electrode terminal and the sealing plate, and the insulating member between the negative electrode terminal and the sealing plate are preferably resin members. Suitable examples of the resin members include those made of polypropylene (PP), polyethylene (PE), polyphenylene sulfide (PPS), and rubber.

Modification 1 illustrates an example in which the electric insulating, heat-resistant member is a ceramic member. However, the entire member is not necessarily made of ceramic. For example, a resin member or metal member having a ceramic layer on its surface may be used.

The secondary battery according to the present invention can be used in a battery pack including secondary batteries all connected in series. However, the secondary battery according to the present invention is very effective when used in a battery pack in which at least two secondary batteries are connected in parallel.

The secondary battery is preferably a non-aqueous electrolyte secondary battery and more preferably a lithium-ion secondary battery. The positive electrode plate, the negative electrode plate, the separator, and the electrolyte may be composed of known materials.

While detailed embodiments have been used to illustrate the present invention, to those skilled in the art, however, it will be apparent from the foregoing disclosure that various changes and modifications can be made therein without departing from the spirit and scope of the invention. Furthermore, the foregoing description of the embodiments according to the present invention is provided for illustration only, and is not intended to limit the invention.

What is claimed is:

1. A secondary battery comprising:
an electrode body that includes a positive electrode plate and a negative electrode plate;
an outer body that has an opening and houses the electrode body;
a sealing plate that is made of metal and seals the opening; and
a terminal that is electrically connected to the positive electrode plate or the negative electrode plate,
wherein
a conduction path between the positive electrode plate or the negative electrode plate and the terminal is provided with a current interrupting mechanism or a fuse part,
the terminal is attached to the sealing plate via an insulating member made of resin,
at least part of the terminal is disposed on a battery outer side with respect to the sealing plate, and
an electrically insulating, intermediate layer or an electrically insulating, intermediate member is disposed between the terminal and the sealing plate,
wherein the intermediate member is disposed between the terminal and an outer surface of the sealing plate,
the insulating member has a portion located between the terminal and the outer surface of the sealing plate, and
in a radial direction of the terminal, the intermediate member is located outward of the insulating member.

2. The secondary battery according to claim 1, wherein the current interrupting mechanism is a pressure-sensitive current interrupting mechanism that operates when an internal pressure of a battery case including the outer body and the sealing plate reaches a predetermined value or higher.

3. The secondary battery according to claim 1, wherein the intermediate layer is formed on a surface of at least one of the terminal, the insulating member, and the sealing plate.

4. The secondary battery according to claim 1, wherein the intermediate layer or the intermediate member has a resistivity of $1.0 \times 10^4$ $\Omega \cdot cm$ or higher at 400° C.

5. The secondary battery according to claim 1, wherein the intermediate layer or the intermediate member has a higher melting point than the insulating member.

6. The secondary battery according to claim 1, wherein the intermediate layer or the intermediate member has a melting point of 400° C. or higher.

7. A battery pack comprising a plurality of the secondary batteries according to claim 1, wherein at least two of the secondary batteries are connected in parallel.

8. A secondary battery comprising:
an electrode body that includes a positive electrode plate and a negative electrode plate;
an outer body that has an opening and houses the electrode body;
a sealing plate that is made of metal and seals the opening; and
a terminal that is electrically connected to the positive electrode plate or the negative electrode plate,
wherein
a conduction path between the positive electrode plate or the negative electrode plate and the terminal is provided with a current interrupting mechanism or a fuse part,
the terminal is attached to the sealing plate via an insulating member made of resin,
at least part of the terminal is disposed on a battery outer side with respect to the sealing plate, and
an electrically insulating, intermediate layer or an electrically insulating, intermediate member is disposed between the terminal and the sealing plate, wherein the intermediate layer or the intermediate member has a melting point of 400° C. or higher.

9. The secondary battery according to claim 8, wherein the current interrupting mechanism is a pressure-sensitive current interrupting mechanism that operates when an internal pressure of a battery case including the outer body and the sealing plate reaches a predetermined value or higher.

10. The secondary battery according to claim 8, wherein the intermediate layer is formed on a surface of at least one of the terminal, the insulating member, and the sealing plate.

11. The secondary battery according to claim 8, wherein the intermediate member is disposed between the terminal and an outer surface of the sealing plate.

12. The secondary battery according to claim 11, wherein the insulating member has a portion located between the terminal and the outer surface of the sealing plate, and in a radial direction of the terminal, the intermediate member is located outward of the insulating member.

13. The secondary battery according to claim 8, wherein the intermediate layer or the intermediate member has a resistivity of $1.0 \times 10^4$ $\Omega \cdot$cm or higher at 400° C.

14. The secondary battery according to claim 8, wherein the intermediate layer or the intermediate member has a higher melting point than the insulating member.

15. A battery pack comprising a plurality of the secondary batteries according to claim 8, wherein at least two of the secondary batteries are connected in parallel.

* * * * *